(12) United States Patent
Wang

(10) Patent No.: US 12,608,917 B2
(45) Date of Patent: Apr. 21, 2026

(54) FACE TRACKING SYSTEM AND METHOD

(71) Applicant: HTC Corporation, Taoyuan (TW)

(72) Inventor: Chun-Li Wang, Taoyuan (TW)

(73) Assignee: HTC Corporation, Taoyuan City (TW)

( * ) Notice: Subject to any disclaimer, the term of this patent is extended or adjusted under 35 U.S.C. 154(b) by 133 days.

(21) Appl. No.: 18/416,902

(22) Filed: Jan. 19, 2024

(65) Prior Publication Data

US 2024/0257499 A1 Aug. 1, 2024

Related U.S. Application Data

(60) Provisional application No. 63/442,460, filed on Feb. 1, 2023.

(51) Int. Cl.
| | |
|---|---|
| *G06V 10/77* | (2022.01) |
| *G06T 3/40* | (2006.01) |
| *G06T 7/246* | (2017.01) |
| *G06T 7/60* | (2017.01) |
| *G06T 11/00* | (2006.01) |
| *G06V 40/16* | (2022.01) |

(52) U.S. Cl.
CPC ............ *G06V 10/7715* (2022.01); *G06T 3/40* (2013.01); *G06T 7/246* (2017.01); *G06T 7/60* (2013.01); *G06T 11/00* (2013.01); *G06V 40/171* (2022.01); *G06T 2207/30201* (2013.01)

(58) Field of Classification Search
CPC . G06T 3/40; G06T 11/00; G06T 7/246; G06T 7/60; G06T 2207/30201; G06T 19/006; G06V 10/7715; G06V 40/171; G06V 40/167; G06V 40/172; G06V 40/174
See application file for complete search history.

(56) References Cited

U.S. PATENT DOCUMENTS

| | | | |
|---|---|---|---|
| 2008/0201144 A1* | 8/2008 | Song .................... | G06V 40/175 704/236 |
| 2020/0139725 A1* | 5/2020 | Benayad-Cherif .. | B23K 26/082 |
| 2022/0035506 A1* | 2/2022 | Zou ......................... | G05F 3/262 |
| 2023/0078978 A1* | 3/2023 | Tadi ..................... | G06V 40/176 382/118 |
| 2023/0090342 A1* | 3/2023 | Barlier ................... | H04L 51/08 |

(Continued)

FOREIGN PATENT DOCUMENTS

| | | |
|---|---|---|
| CN | 112106066 | 12/2020 |
| CN | 113646733 | 11/2021 |

OTHER PUBLICATIONS

"Office Action of Taiwan Counterpart Application", issued on Aug. 23, 2024, p. 1-p. 19.

*Primary Examiner* — Phi Hoang
(74) *Attorney, Agent, or Firm* — JCIPRNET

(57) ABSTRACT

A face tracking system is provided. The face tracking system includes a camera and a processor. The camera is configured to obtain a face image of a face of a user. The processor is configured to identify a facial feature of the face of the user based on the face image, determine a size range of a size of the facial feature based on the face image, and determine transformation relationship between the facial feature of the face of the user and a virtual facial feature of an avatar corresponding to the facial feature based on the size range of the size of the facial feature and a virtual size range of a virtual size of the virtual facial feature.

20 Claims, 8 Drawing Sheets

Input     Neural Network     Blendshape set [0.0~1.0]     Drive Avatar

200A

(56) References Cited

U.S. PATENT DOCUMENTS

2023/0177785 A1* 6/2023 Pejsa .................. G02B 27/0093
345/633
2023/0319223 A1* 10/2023 Naruniec ............. G06V 40/176
348/239
2024/0257499 A1* 8/2024 Wang ...................... G06T 7/246

* cited by examiner

110

120

Camera

Processor

100

FACE TRACKING SYSTEM AND METHOD

CROSS REFERENCE TO RELATED APPLICATION

This application claims the priority benefit of U.S. provisional application Ser. No. 63/442,460, filed on Feb. 1, 2023. The entirety of the above-mentioned patent application is hereby incorporated by reference herein and made a part of this specification.

BACKGROUND

Technical Field

The disclosure relates to a face tracking system; particularly, the disclosure relates to a face tracking system and a face tracking method.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a face tracking system and a face tracking method, so as to improve the user experience.

In this disclosure, a face tracking system is provided. The face tracking system includes a camera and a processor. The camera is configured to obtain a face image of a face of a user. The processor is configured to identify a facial feature of the face of the user based on the face image, determine a size range of a size of the facial feature based on the face image, and determine a transformation relationship between the facial feature of the face of the user and a virtual facial feature of an avatar based on the size range of the size of the facial feature and a virtual size range of a virtual size of the virtual facial feature.

In this disclosure, a face tracking method is provided. The face tracking method includes: obtaining a face image of a face of a user; identifying a facial feature of the face of the user based on the face image; determining a size range of a size of the facial feature based on the face image; and determining a transformation relationship between the facial feature of the face of the user and a virtual facial feature of an avatar based on the size range of the size of the facial feature and a virtual size range of a virtual size of the virtual facial feature.

Based on the above, according to the face tracking system and the face tracking method, facial expressions of a user may be correctly mapped to virtual facial expressions of an avatar based on the face image of the user. As a result, avatars can faithfully represent the user and communication intentions of the user, thereby improving immersion.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
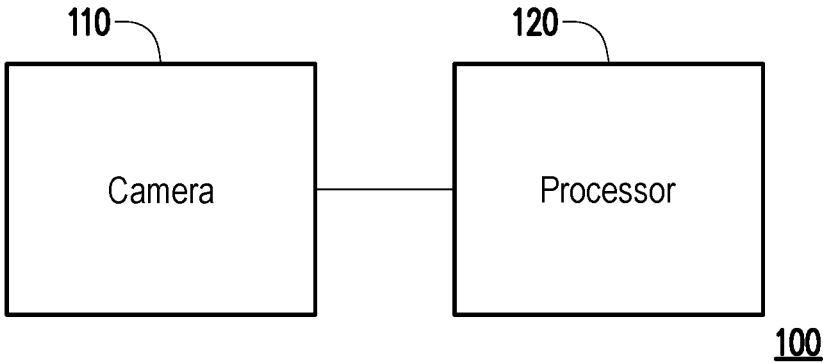
FIG. 1 is a schematic diagram of a face tracking system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements.

In the virtual world, avatars are used to represent users. For example, an avatar may be customized to look like a user, or the avatar may be used to create a completely new identity. This can be useful for users who want to express themselves creatively or who want to explore different aspects of their personality. Further, with the help of the avatar, the user may facilitate communication and collaboration with other people in real time clearly. Furthermore, when users see their own avatars interacting with the world around them, it can help them to feel more immersed in the experience. That is, the avatars representing the users may be useful for the users to express ourselves, communicate with others, and experience new things in the virtual world.

However, facial features are different from a user to another user. While the difference is not considered, a facial expression of an avatar may be not exactly the same as the user, which may lead to miscommunication, loss of authenticity, or reduced immersion. For example, if the user is smiling but the avatar is frowning, the other person may think that the user is unhappy. This can be especially problematic in situations where communication is critical, such as during a business meeting or a job interview. In the meantime, this may reduce the user's sense of immersion in the virtual world. Therefore, it is the pursuit of people skilled in the art to provide a proper method to establish a facial expression of the avatar representing the user correctly.

FIG. 1 is a schematic diagram of a face tracking system according to an embodiment of the disclosure. With reference FIG. 1, a face tracking system 100 may include a camera 110 and a processor 120. The camera 110 may be configured to obtain a face image of a face of a user. The processor 120 may be configured to identify a facial feature of the face of the user based on the face image. Further, the processor 120 may be configured to determine a size range of a size of the facial feature based on the face image. Furthermore, the processor 120 may be configured to determine a transformation relationship between the facial feature of the face of the user and a virtual facial feature of an avatar corresponding to the facial feature based on the size range of the size of the facial feature and a virtual size range of a virtual size of the virtual facial feature.

In this manner, the virtual facial feature of the avatar may faithfully represent the facial feature of the user, thereby providing clear communication and improving the immersion.

In one embodiment, the face tracking system 100 may be a head-mounted display (HMD) device and the HMD device may be configured to display content of AR, VR, MR, or XR. The HMD device may include, for example, a headset, wearable glasses (e.g., AR/VR goggles), other similar devices adapted for AR, VR, MR, XR or other reality related technologies, or a combination of these devices. However, this disclosure is not limited thereto.

In one embodiment, the camera 110, may include, for example, a complementary metal oxide semiconductor (CMOS) camera, a charge coupled device (CCD) camera, a light detection and ranging (LiDAR) device, a radar, an infrared sensor, an ultrasonic sensor, other similar devices, or a combination of these devices. The disclosure is not limited thereto.

In one embodiment, the processor 120 may include, for example, a microcontroller unit (MCU), a central processing unit (CPU), a microprocessor, a digital signal processor (DSP), a programmable controller, a programmable logic device (PLD), other similar devices, or a combination of these devices. The disclosure is not limited thereto. In addition, in an embodiment, each of functions of the processor 120 may be achieved as multiple program codes. The program codes are stored in a memory, and executed by the processor 120. Alternatively, in an embodiment, each of the functions of the processor 120 may be achieved as one or more circuits. The disclosure does not limit the use of software or hardware to achieve the functions of the processor 120.

In one embodiment, the face tracking system 100 may further include a display module for displaying the avatar in a virtual world and the display module may include, for example, an organic light-emitting diode (OLED) display device, a mini LED display device, a micro LED display device, a quantum dot (QD) LED display device, a liquid-crystal display (LCD) display device, a tiled display device, a foldable display device, or an electronic paper display (EPD). However, the disclosure is not limited thereto.

In one embodiment, the face tracking system 100 may further include a memory and the memory may include, for example, NAND flash memory cores, NOR flash memory cores, static random access memory (SRAM) cores, dynamic random access memory (DRAM) cores, magnetoresistive random access memory (MRAM) cores, Phase change memory (PCM) cores, resistive random access memory (ReRAM) cores, 3D XPoint memory cores, ferroelectric random-access memory (FeRAM) cores, and other types of memory cores that are suitable for storing data. However, this disclosure is not limited thereto.

Figure 2A:
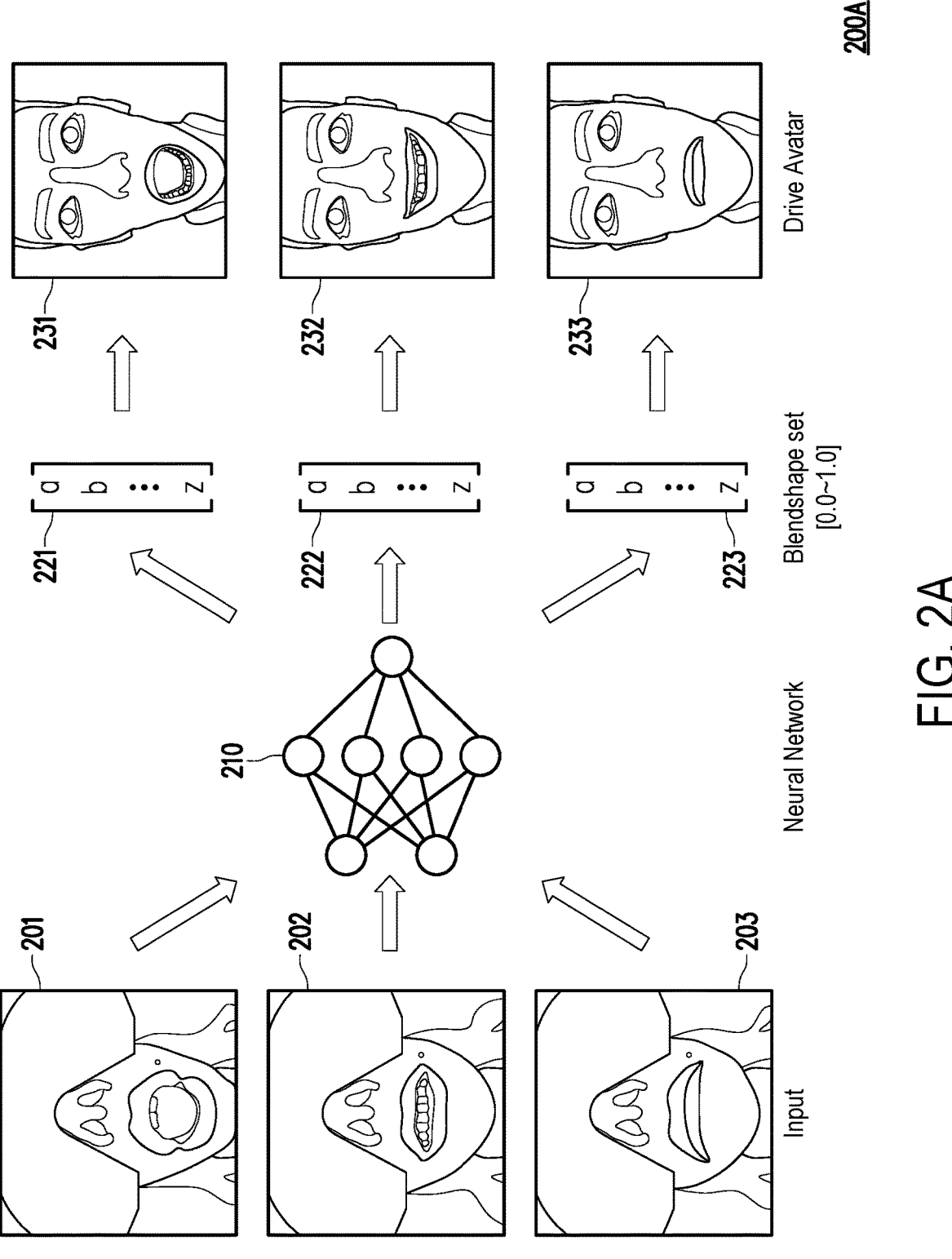
FIG. 2A is a schematic diagram of a face tracking scenario according to an embodiment of the disclosure.

FIG. 2A is a schematic diagram of a face tracking scenario according to an embodiment of the disclosure. With reference to FIG. 1 and FIG. 2A, a face tracking scenario 200A depicts a face tracking process of a face of a user. It is noted that, for the sake of explanation, a HMD device for capturing image of the user is depicted as being worn on a head of the user, but this disclosure is not limited thereto. In one embodiment, an external device or including a camera may be used to capture image of the user.

As shown in face images 201, 202, 203, an external camera or a camera of the HMD device may be configured to capture an image of the face of the user. In the face image 201, the mouth of the user is opened widely. In the face image 202, the mouth of the user is open slightly. In the face image 203, the mouth of the user is close.

A neural network 210 may be pre-trained and configured to convert the face images 201, 202, 203 into blendshape vectors 221, 222, 223, respectively. The blendshape vectors 221, 222, 223 may be called a blendshape set and each element of the blendshape vectors 221, 222, 223 may represent a blendshape of the face of the user. For example, a blendshape may be a muscle of face of the user, but this disclosure not limited thereto. Furthermore, values of elements (a, b, . . . , z) in each vector in the blendshape set may be from 0.0 to 1.0. For example, 0.0 may indicate a size of a blendshape being smallest and 1.0 may indicate the size of the blendshape being largest. Table 1 shows some exemplary blendshapes related to a lip or an eye of a user, but this disclosure is not limited thereto.

TABLE 1

| | Lip | Eye |
|---|---|---|
| Jaw_Left | Cheek_Puff_Left | Eye_Left_squeeze |
| Jaw_Right | Cheek_Puff_Right | Eye_Right_squeeze |
| Jaw_Forward | Cheek_Suck | Eye_Right_squeeze |
| Jaw_Open | Mouth_Upper_UpLeft | Eye_Left_Right |
| Mouth_Ape_Shape | Mouth_Upper_UpRight | Eye_Left_Left |
| Mouth_Upper_Left | Mouth_Lower_DownLeft | Eye_Left_Up |
| Mouth_Upper_Right | Mouth_Lower_DownRight | Eye_Left_Down |
| Mouth_Lower_Left | Mouth_Upper_Inside | Eye_Right_Blink |
| Mouth_Lower_Right | Mouth_Lower_Inside | Eye_Right_Right |
| Mouth_Upper_Overturn | Mouth_Lower_Overlay | Eye_Right_Left |

TABLE 1-continued

| | Lip | Eye |
| --- | --- | --- |
| Mouth_Lower_Overturn | Tongue_LongStep1 | Eye_Right_Up |
| Mouth_Pout | Tongue_LongStep2 | Eye_Right_Down |
| Mouth_Smile_Left | Tongue_Left | Eye_Left_Wide |
| Mouth_Smile_Right | Tongue_Right | Eye_Right_Wide |
| Mouth_Sad_Left | Tongue_Up | |
| Mouth_Sad_Right | Tongue_Down | |
| | Tongue_Roll | |

Moreover, an external display of the HMD device may be configured to display a virtual world. The processor 120 may be configured to generate virtual face images 231, 232, 233 of an avatar in the virtual world based on the blendshape vector 221, 222, 223, respectively. That is, the virtual face of the avatar in the virtual world may follow a change of the face of the user in the real world.

Figure 2B:
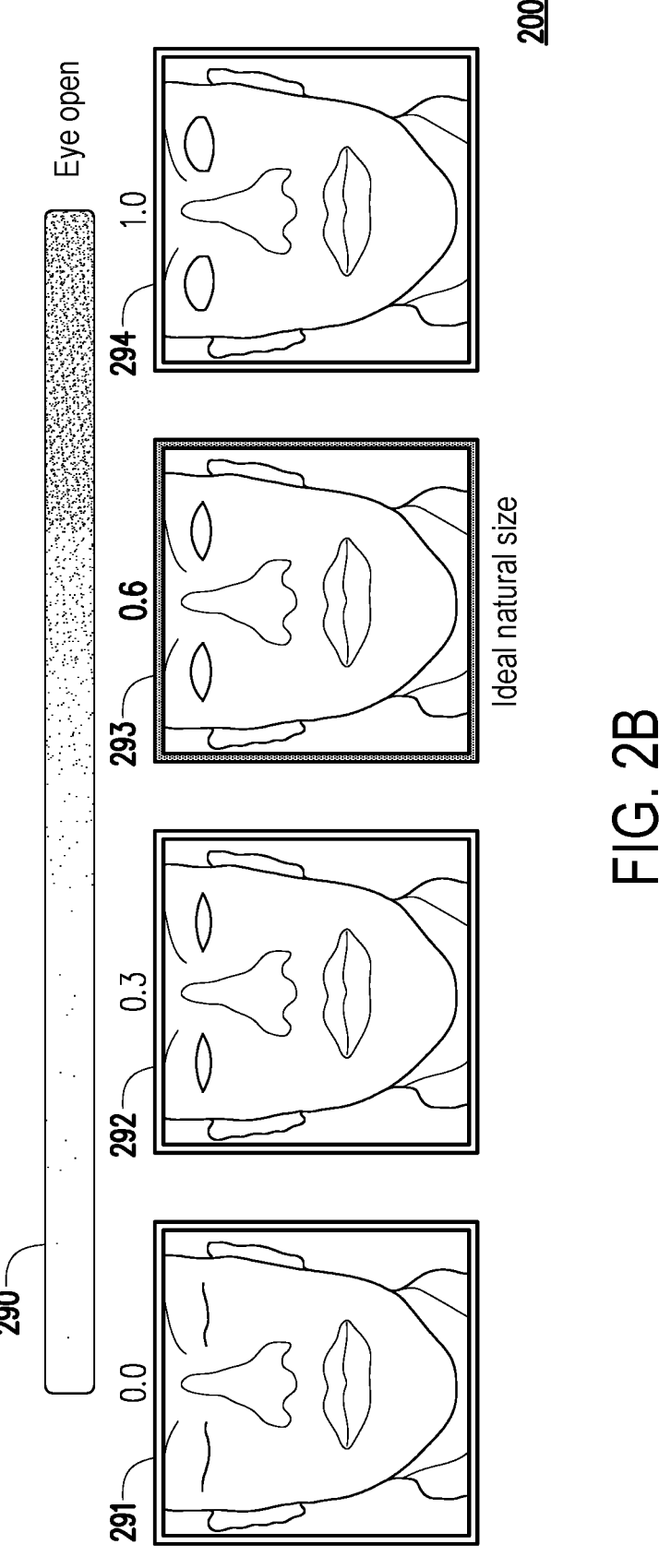
FIG. 2B is a schematic diagram of a face tracking scenario according to an embodiment of the disclosure.

FIG. 2B is a schematic diagram of a face tracking scenario according to an embodiment of the disclosure. With reference to FIG. 1 to FIG. 2B, a face tracking scenario 200B depicts a face tracking process of eyes of a user. The face tracking scenario 200B may include a blendshape bar 290 and virtual face images 291, 292, 293, 294.

In one embodiment, the blendshape bar 290 may be configured to indicate a virtual size (a degree of opening) of virtual eyes of an avatar and the virtual size may be from 0.0 to 1.0. That is, a virtual size range of the virtual eyes may be from 0.0 to 1.0. For example, the leftmost (0.0) may represent the virtual eyes closed and the rightmost (1.0) may represent the virtual eyes fully opened. It is noted that, the fully opening of the virtual eyes may represent that the user deliberately opens the eyes wide. That is, while the user opens the eyes normally, the virtual size may be smaller than 1.0, for example, 0.6. In other words, the virtual size being 0.6 may represent an ideal natural (neutral) size of the eyes of the avatar and the user, but this disclosure is not limited thereto.

Figure 3A:
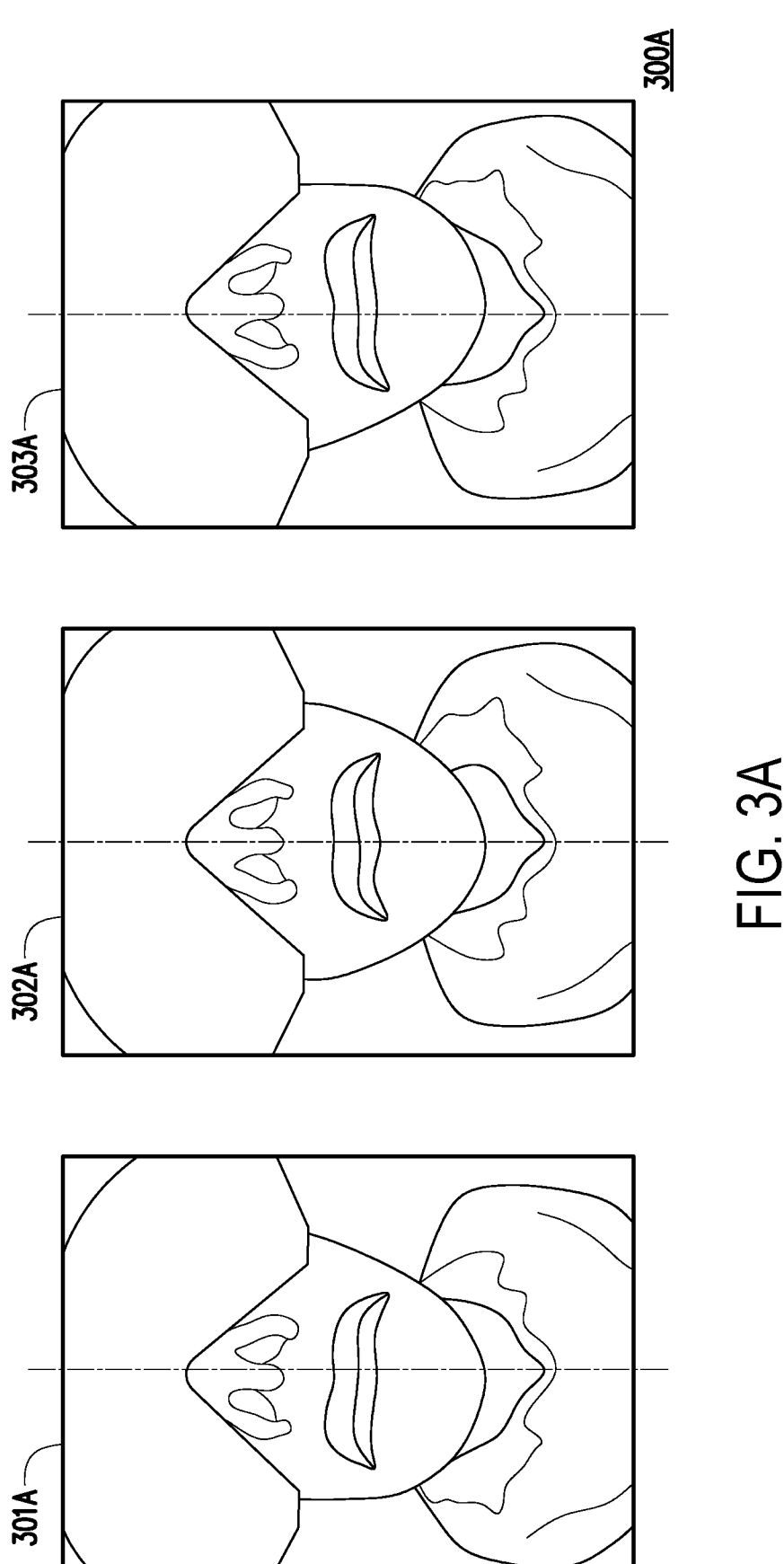
FIG. 3A is a schematic diagram of a face tracking scenario according to an embodiment of the disclosure.

FIG. 3A is a schematic diagram of a face tracking scenario according to an embodiment of the disclosure. Referring to FIG. 3A, a face tracking scenario 300A includes face image 301A, 302A, 303A, which represent three types of jaws of users.

In one embodiment, in the face image 301A, while the user places his head naturally, a direction of his jaw (chin) may be facing leftwards. That is, although the user thought his head is in a neutral (natural) position, more parts of his jaw may be on a left side of a middle line. This may be caused by uneven muscle tension (e.g., due to poor posture) or congenital facial asymmetry (born like this), but this disclosure is not limited thereto.

In one embodiment, in the face image 302A, while the user places his head naturally, a direction of his jaw may be facing downwards. That is, while the user thought his head is in a neutral position, his jaw is exactly symmetrical to the middle line. In other words, this may be caused by a correct congenital facial symmetry, but this disclosure is not limited thereto.

In one embodiment, in the face image 303A, while the user places his head naturally, a direction of his jaw may be facing rightwards. That is, although the user thought his head is in a neutral position, more parts of his jaw may be on a right side of a middle line. This may be caused by uneven muscle tension or congenital facial asymmetry, but this disclosure is not limited thereto.

Figure 3B:
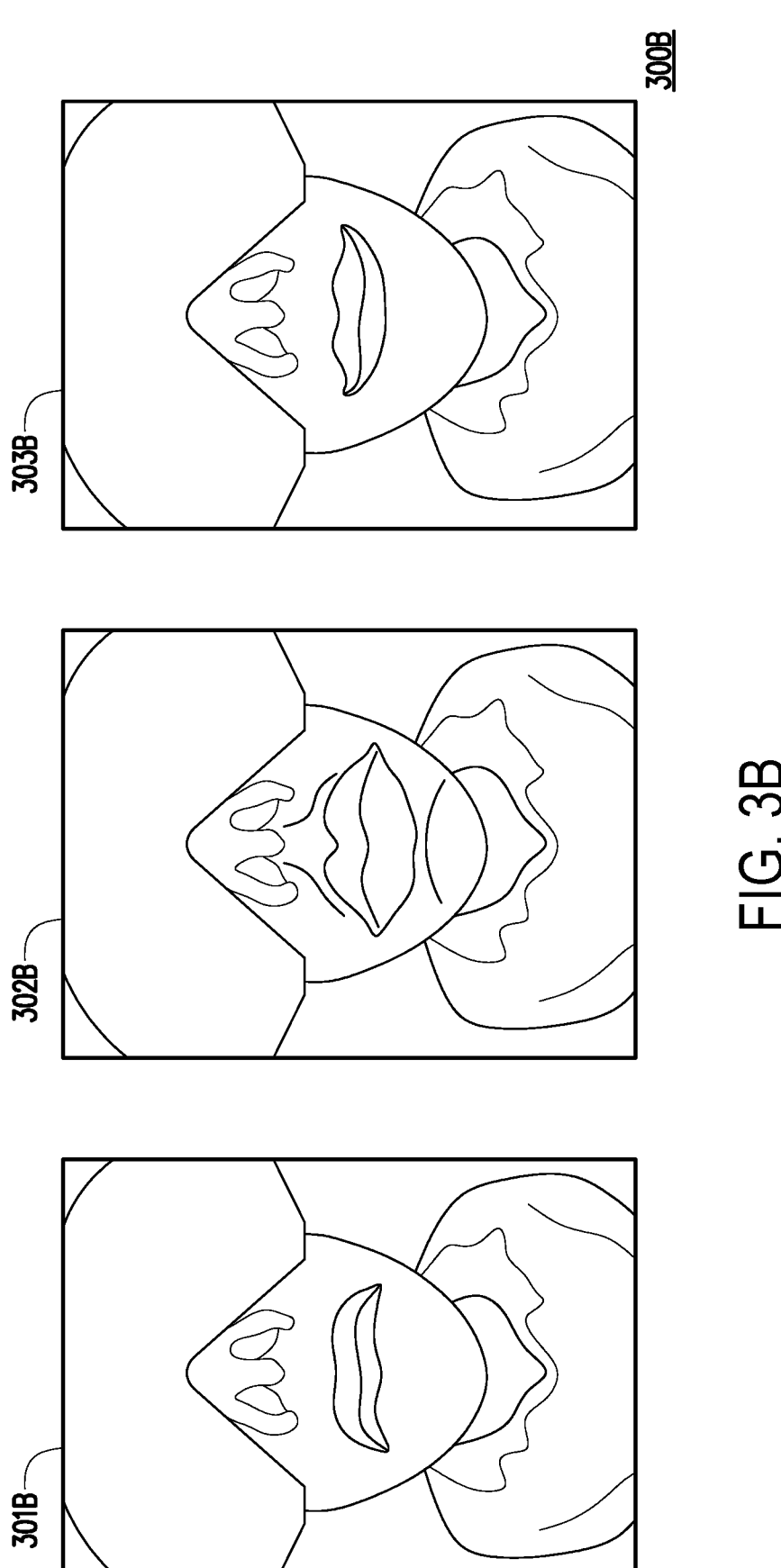
FIG. 3B is a schematic diagram of a face tracking scenario according to an embodiment of the disclosure.

FIG. 3B is a schematic diagram of a face tracking scenario according to an embodiment of the disclosure. Referring to FIG. 3B, a face tracking scenario 300B includes face image 301B, 302B, 303B, which represent three types of lips of users.

In one embodiment, in the face image 301B, while the user makes a neutral facial expression, his face may actually look sad. That is, although the user thought there is no expression on the face, the lip may be facing downwards. This may be caused by uneven muscle tension or innate structure (born like this), but this disclosure is not limited thereto.

In one embodiment, in the face image 302B, while the user makes a neutral facial expression, his lip may actually look like pursing. That is, although the user thought there is no expression on the face, the lips may be still concentrated towards the middle. This may be caused by uneven muscle tension or innate structure (born like this), but this disclosure is not limited thereto.

In one embodiment, in the face image 303B, while the user makes a neutral facial expression, his face may actually look like smiling. That is, although the user thought there is no expression on the face, the lip may be facing upwards. This may be caused by uneven muscle tension or innate structure (born like this), but this disclosure is not limited thereto.

It is noted that, while a user makes a neutral facial expression, a virtual face of an avatar should also make a virtual facial expression. However, referring to FIG. 3A and FIG. 3B, although the user thought there is no expression on the face, there may be sill some kind of expressions on a virtual face of the avatar due to uneven muscle tension, congenital facial asymmetry, innate structure, or any other reasons. That is, a facial expression of the user is not correctly mapped to a virtual facial expression of the avatar, which may lead to miscommunication, loss of authenticity, or reduced immersion.

Figure 4A:
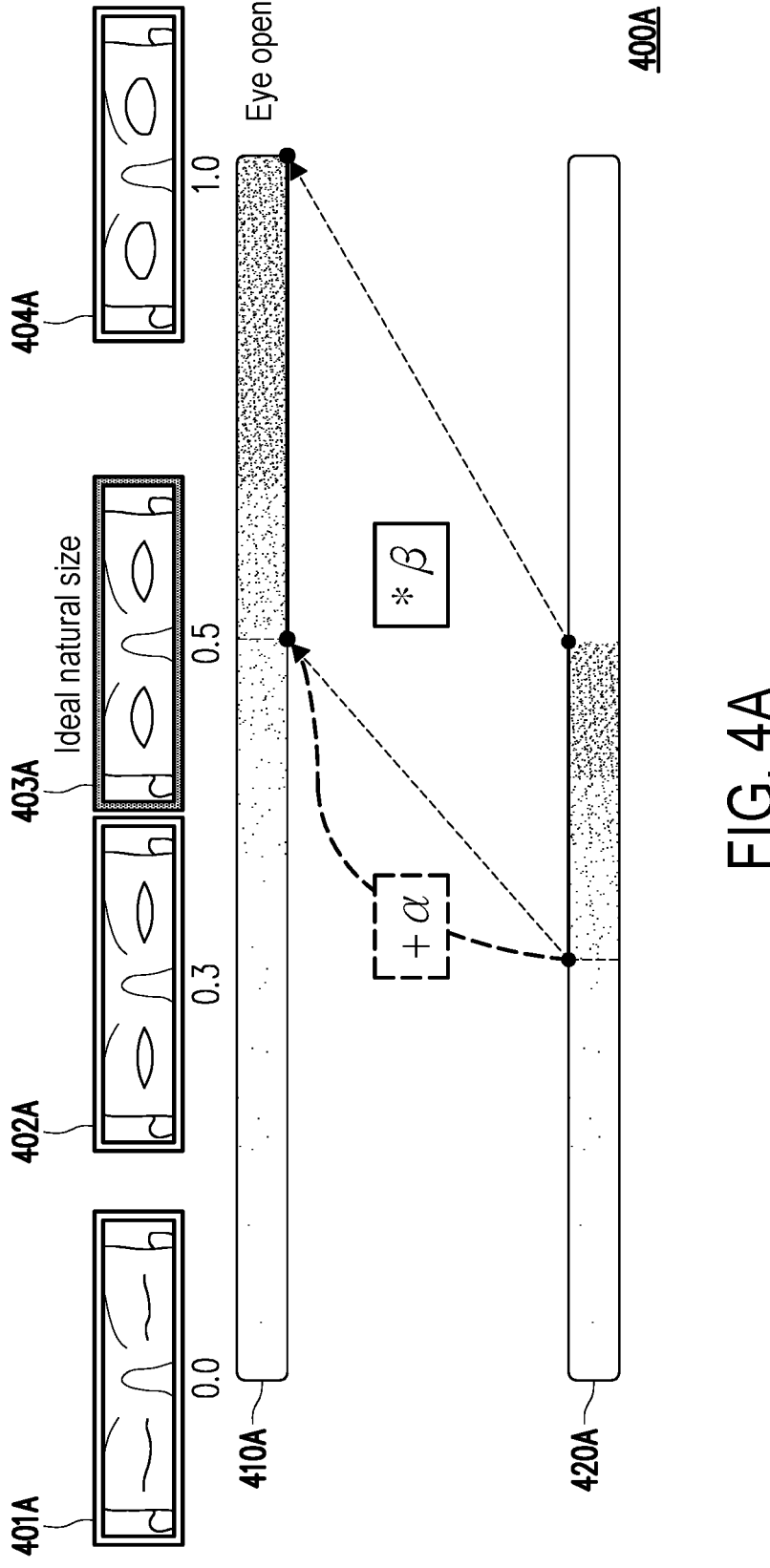
FIG. 4A is a schematic diagram of a face tracking scenario according to an embodiment of the disclosure.

FIG. 4A is a schematic diagram of a face tracking scenario according to an embodiment of the disclosure. With reference to FIG. 1 and FIG. 4A, a face tracking scenario 400A depicts a calibration of a face tracking process of eyes of a user. The face tracking scenario 400A may include blendshape bars 410A, 420A and virtual face images 401A, 402A, 403A, 404A.

In one embodiment, the blendshape bar 410A shows a virtual size range of virtual eyes of an avatar. That is, the blendshape bar 410A may be configured to indicate a virtual size (a degree of opening) of the virtual eyes and the virtual size may be from 0.0 (i.e., corresponding to virtual face image 401A) to 1.0 (i.e., corresponding to virtual face image 404A). For example, 0.0 may indicate a virtual size of the virtual eyes being smallest (e.g., closed) and 1.0 may indicate the virtual size of the virtual eyes being largest (e.g., fully opened). In one embodiment, 0.5 (i.e., corresponding to virtual face image 403A) may indicate a virtual neural size of the virtual eyes. The virtual neural size may be determined based on statistics of big data, but this disclosure is not limited thereto. That is, ideally, for most of users, 0.5 should be an ideal virtual neural size for avatars representing the users naturally.

In one embodiment, the blendshape bar 420A shows a size range of eyes (i.e., facial feature) of a user. Ideally, in order to utilizing the avatar to representing the user faithfully, the virtual size rage of the avatar should be same as the size rage of the user. However, in one embodiment, while a user has small eyes, a size range of a size of the eyes may be smaller, for example from 0.0 to 0.5 instead of from 0.0 to 1.0. That is, while the user deliberately opens the eyes wide, the avatar may look like opening the virtual eyes normal (i.e., virtual size being 0.5). Further, while the user opens the eyes normally, the avatar may look like squinting the virtual eyes (i.e., virtual size being 0.3 (i.e., corresponding to virtual face image 402A)). It is noted that, this may due to using a general model for converting facial features of a user to virtual facial features of an avatar.

In order to utilizing the avatar to representing the user faithfully, instead of a personalized model, a personalized model may be used for converting facial features of a user to virtual facial features of an avatar. That is, while the user deliberately opens the eyes wide, the avatar also looks like fully opening the virtual eyes (i.e., virtual size being 1.0). Further, while the user opens the eyes normally, the avatar may look like opening the virtual eyes normally (i.e., virtual size being 0.5). In other words, a transformation relationship between a facial feature of the face of the user and a virtual facial feature (corresponding to the facial feature) of an avatar may be determined. For example, the transformation relationship may be determined based on a size range of a size of the facial feature and a virtual size range of a virtual size of the virtual facial feature. However, this disclosure is not limited thereto.

In one embodiment, by continuously obtaining the face image from the camera 110 over time, a plurality of sizes of the facial feature of the user may be obtained. Further, based on the plurality of size of the facial feature, a size range of a size of the facial feature may be obtained. Furthermore, by taking a median value or an average value of the plurality of sizes, a median size or an average size of the facial feature may be determined. The median size or the average size of the facial feature may be further determined as a neutral size of the facial feature. That is, the processor 120 may be configured to determine a neutral size of the size of the facial feature based on the face image and map the neutral size to a virtual neutral size of the virtual facial feature. In this manner, while the user makes a neutral facial expression, a virtual face of an avatar may also make a neutral facial expression. In other words, a transformation relationship between a facial feature of the face of the user and a virtual facial feature (corresponding to the facial feature) of an avatar may be determined. Therefore, the avatar may be able to faithfully represent the user, thereby increasing the immersion.

In one embodiment, by continuously obtaining the face image from the camera 110 over time, a plurality of sizes of the facial feature of the user may be obtained. By taking a maximum value of the plurality of sizes, a maximum size average size of the facial feature may be determined. That is, the processor 120 may be configured to determine a maximum size of the size of the facial feature based on the face image and map the maximum size to a virtual maximum size of the virtual facial feature. Similarly, the processor 120 may be configured to determine a minimum size of the size of the facial feature based on the face image and map the minimum size to a virtual minimum size of the virtual facial feature.

In one embodiment, a shift factor (e.g., $\alpha$ in FIG. 4A) may be utilized to align a neutral size (e.g. 0.3) of a facial feature of a user with a virtual neutral size (e.g., 0.5) of a virtual facial feature of an avatar. For example, a difference between the neutral size of the facial feature of the user and the virtual neutral size of the virtual facial feature of the avatar may be calculated. Then, the difference may be determined as the shift factor. By applying the shift factor to the neutral size, the neutral size may be mapped to the virtual neutral size correctly. Moreover, the shift factor may not only applied to the neutral size of the facial feature, but also all other sizes of the facial feature. That is, a size range of a size of the facial feature may be mapped to a virtual size range of a virtual size of the virtual facial feature based on the shift factor. In other words, the processor 120 may be configured to determine a shift factor based on a difference between a neutral size of the size of the facial feature and a neutral virtual size of the virtual facial feature. Further, the processor 120 may be configured to map the size of the facial feature to a virtual size of the virtual facial feature based on the shift factor.

In one embodiment, a scale factor (e.g., $\beta$ in FIG. 4A) may be utilized to align a maximum size (e.g., 0.5) of a facial feature of a user with a virtual maximum size (e.g., 1.0) of a virtual facial feature of an avatar. For example, a difference between the maximum size of the facial feature of the user and the virtual maximum size of the virtual facial feature of the avatar may be calculated. Then, the difference may be determined as the scale factor. By applying the scale factor to the maximum size, the maximum size may be mapped to the virtual maximum size correctly. Moreover, the scale factor may not only applied to the maximum size of the facial feature, but also all other sizes of the facial feature. That is, a size range of a size of the facial feature may be mapped to a virtual size range of a virtual size of the virtual facial feature based on the scale factor. In other words, the processor 120 may be configured to determine a scale factor based on a difference between a maximum size of the size of the facial feature and a neutral maximum size of the virtual facial feature. Further, the processor 120 may be configured to map the size of the facial feature to a virtual size of the virtual facial feature based on the scale factor.

In one embodiment, the shift factor (e.g., $\alpha$ in FIG. 4A) and the scale factor (e.g., $\beta$ in FIG. 4A) may be both utilized for mapping a size of a facial feature of the user to a virtual size of the virtual facial feature of the avatar. A formula 1 for the mapping may be shown as below.

$$\begin{bmatrix} \hat{a} \\ \hat{b} \\ \hat{c} \\ \vdots \\ \hat{z} \end{bmatrix} = \left( \begin{bmatrix} a \\ b \\ c \\ \vdots \\ z \end{bmatrix} + \begin{bmatrix} \alpha_a \\ \alpha_b \\ \alpha_c \\ \vdots \\ \alpha_z \end{bmatrix} \right) * \begin{bmatrix} \beta_a \\ \beta_b \\ \beta_c \\ \vdots \\ \beta_z \end{bmatrix} \qquad \text{(Formula 1)}$$

In the formula one, the vectors from left to right are calibrated blendshape vector, original blendshape vector, shift vector, and scale vector, respectively. Each element (a, b, c . . . etc.) in these vectors may represent a facial feature (blendshape) of the face of the user. That is, the processor 120 may be configured to determine a shift factor based on a difference between a neutral size of the size of the facial feature and a neutral virtual size of the virtual facial feature. Further, the processor 120 may be configured to determine a scale factor based on a difference between a maximum size of the size of the facial feature and a neutral maximum size of the virtual facial feature. Furthermore, the processor 120 may be configured to map the size of the facial feature to a virtual size of the virtual facial feature by adding the shift factor to the size and then multiply the scale factor.

It is worth mentioned that, after the shift factor and the scale factor being determined, the shift factor and the scale factor may be stored in user information in a memory of the face tracking system 100. In this manner, next time when the user utilizes the face tracking system 100 (such as put on the HMD device), the face tracking system 100 may read the user information in the memory and utilized the shift factor and the scale factor for mapping a size of a facial feature of the user to a virtual size of the virtual facial feature of the avatar. That is, the processor 120 may be configured to determine the transformation relationship between the facial feature of face of the user and the virtual facial feature of the avatar based on the user information in the memory during a startup of the face tracking system 100.

In one embodiment, while the user feels that the avatar is not making facial expression properly, a calibration of the transformation relationship may be performed according to a user instruction. During the calibration, the user may make a neutral facial expression and the face tracking system 100 may map the neutral facial expression to a virtual neutral facial expression of the avatar. Similarly, during the calibration, the user may make an extreme (e.g., maximum or minimum) facial expression and the face tracking system 100 may map the extreme facial expression to a virtual extreme facial expression of the avatar. That is, the processor 120 may be configured to perform a calibration of the transformation relationship between the facial feature of face of the user and the virtual facial feature of the avatar according to a user instruction. Further, the processor 120 may be configured to map the neutral facial expression of the user to the virtual neutral facial expression of the avatar. Furthermore, the processor 120 may be configured to map the extreme facial expression of the user to the virtual extreme facial expression of the avatar.

In one embodiment, instead of performing the calibration once, the calibration may be performed in the background continuously or periodically over time. That is, the processor 120 may be configured to update the transformation relationship between the facial feature of face of the user and the virtual facial feature of the avatar based on the face image over time.

In this manner, the transformation relationship between the facial feature of face of the user and the virtual facial feature of the avatar may be determined, and a personalized model may be used to correctly map the facial expressions of the user to the virtual facial expressions of the avatar. As a result, the avatar may faithfully represent the user and the communication intentions of the user, thereby increasing immersion.

Figure 4B:
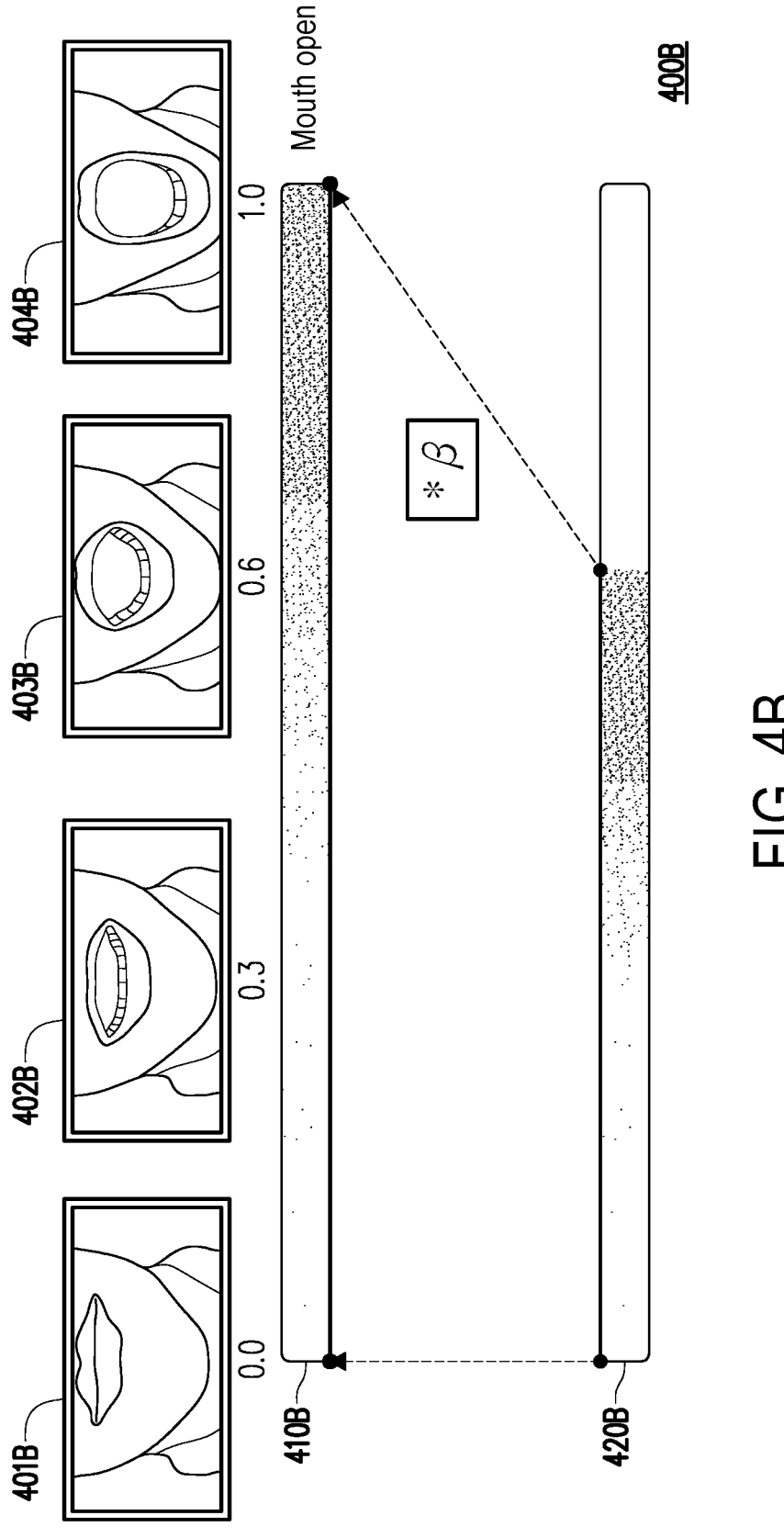
FIG. 4B is a schematic diagram of a face tracking scenario according to an embodiment of the disclosure.

FIG. 4B is a schematic diagram of a face tracking scenario according to an embodiment of the disclosure. With reference to FIG. 1, FIG. 4A, and FIG. 4B, a face tracking scenario 400B depicts a calibration of a face tracking process of a mouth of a user. The face tracking scenario 400B may include blendshape bars 410B, 420B and virtual face images 401B, 402B, 403B, 404B. Comparing with the face tracking scenario 400A, the face tracking scenario 400B a calibration of a face tracking process of a mouth instead of eyes. The details of the calibration may be referred to the descriptions of the calibration in FIG. 4A to obtain sufficient teachings, suggestions, and implementation embodiments, while the details are not redundantly described seriatim herein.

In one embodiment, since a mouth of a person is normally closed, a virtual neural size of a virtual mouth of the avatar may be zero, which is also the minimum value of a virtual size range of a size of the virtual mouth. Similarly, a neural size of a mouth of the user may be zero, which is also the minimum value (i.e., corresponding to the virtual face image 401B) of a size range of a size of the mouth. Therefore, the neutral size of the mouth may not be needed to be calibrated for mapping the size of the mouth to the virtual size of the virtual mouth.

However, in one embodiment, while a user has a small mouth, a size range of a size of the mouth may be smaller, for example from 0.0 to 0.6 instead of from 0.0 to 1.0. That is, while the user deliberately opens the mouth wide (maximum size), the avatar may look like opening the virtual mouth normal (i.e., virtual size being 0.6) (i.e., corresponding to the virtual face image 404B).

In order to utilizing the avatar to representing the user faithfully, by continuously obtaining the face image from the camera 110 over time, a plurality of sizes of the mouth (i.e., facial feature) of the user may be obtained. By taking a maximum value of the plurality of sizes, a maximum size average size of the facial feature may be determined. Further, a difference between the maximum size of the facial feature of the user and the virtual maximum size of the virtual facial feature of the avatar may be calculated. Then, the difference may be determined as the scale factor. By applying the scale factor to the maximum size, the maximum size may be mapped to the virtual maximum size correctly (e.g., dashed arrow between blendshape bar 410B and blendshape bar 420B). Moreover, the scale factor may not only applied to the maximum size of the facial feature, but also all other sizes of the facial feature (e.g., corresponding to the virtual face images 402B, 403B). That is, a size range of a size of the facial feature may be mapped to a virtual size range of a virtual size of the virtual facial feature based on the scale factor.

Figure 5:
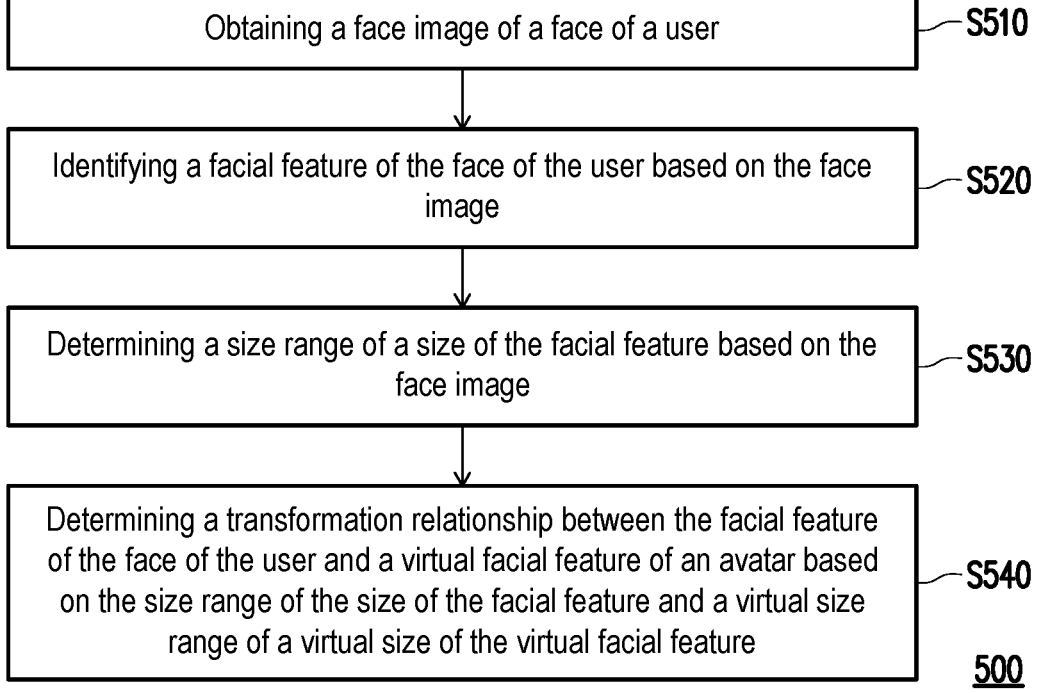
FIG. 5 is a schematic flowchart of a face tracking method according to an embodiment of the disclosure.

FIG. 5 is a schematic flowchart of a face tracking method according to an embodiment of the disclosure. With reference to FIG. 1 and FIG. 5, a face tracking method may include steps S510, S520, S530, S540.

In the step S510, a face image of a face of a user may be obtained from the camera 110. In the step S520, a facial feature of the face of the user may be identified based on the face image by the processor 120. In the step S530, a size range of a size of the facial feature based on the face image may be determined by the processor 120. In the step S540, a transformation relationship between the facial feature of the face of the user and a virtual facial feature of an avatar based on the size range of the size of the facial feature and a virtual size range of a virtual size of the virtual facial feature may be determined by the processor 120.

In addition, the implementation details of the face tracking method 500 may be referred to the descriptions of FIG. 1 to FIG. 4B to obtain sufficient teachings, suggestions, and implementation embodiments, while the details are not redundantly described seriatim herein.

In summary, according to the face tracking system 100 and the face tracking method 500, a size range of a size of a facial feature of the user may be mapped to a virtual size range of a virtual size of a virtual facial feature of the avatar correctly. Therefore, a clear communication may be provided and the immersion may be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A face tracking system, comprising:
   a camera, configured to obtain a face image of a face of a user; and
   a processor, configured to:
   identify a facial feature of the face of the user based on the face image;
   determine a size range of a size of the facial feature based on the face image; and
   determine a transformation relationship between the facial feature of the face of the user and a virtual facial feature of an avatar based on the size range of the size of the facial feature and a virtual size range of a virtual size of the virtual facial feature,
   wherein the processor is further configured to:
   according to a user instruction, perform a calibration of the transformation relationship; wherein during the calibration, the processor is configured to, while the user makes a neutral facial expression, map the neutral facial expression of the user to a virtual neutral facial expression of the avatar by aligning a difference between a neutral size of the size of the facial feature and a neutral virtual size of the virtual facial feature, wherein the virtual neutral facial expression is a neutral expression.

2. The face tracking system according to claim 1, wherein the processor is further configured to:
   determine the neutral size of the size of the facial feature based on the face image;
   map the neutral size to the neutral virtual size of the virtual facial feature.

3. The face tracking system according to claim 1, wherein the processor is further configured to:
   determine a maximum size of the size of the facial feature based on the face image; and
   map the maximum size to a virtual maximum size of the virtual facial feature.

4. The face tracking system according to claim 1, wherein the processor is further configured to:
   determine a minimum size of the size of the facial feature based on the face image; and
   map the minimum size to a virtual minimum size of the virtual facial feature.

5. The face tracking system according to claim 1, wherein the processor is further configured to:
   determine a shift factor based on the difference between the neutral size of the size of the facial feature and the neutral virtual size of the virtual facial feature; and
   map the size of the facial feature to the virtual size of the virtual facial feature based on the shift factor.

6. The face tracking system according to claim 1, wherein the processor is further configured to:
   determine a scale factor based on a difference between a maximum size of the size of the facial feature and a neutral maximum size of the virtual facial feature; and
   map the size of the facial feature to the virtual size of the virtual facial feature based on the scale factor.

7. The face tracking system according to claim 1, wherein the processor is further configured to:

determine a shift factor based on the difference between the neutral size of the size of the facial feature and the neutral virtual size of the virtual facial feature;
   determine a scale factor based on a difference between a maximum size of the size of the facial feature and a neutral maximum size of the virtual facial feature; and
   map the size of the facial feature to the virtual size of the virtual facial feature by adding the shift factor to the size and then multiplying by the scale factor.

8. The face tracking system according to claim 1, wherein the processor is further configured to:
   perform a calibration of the transformation relationship based on user information in a memory during a startup of the face tracking system.

9. The face tracking system according to claim 1, wherein the processor is further configured to:
   map an extreme facial expression of the user to a virtual extreme facial expression of the avatar.

10. The face tracking system according to claim 1, wherein the processor is further configured to:
   update the transformation relationship based on the face image over time.

11. A face tracking method, comprising:
   obtaining a face image of a face of a user;
   identifying a facial feature of the face of the user based on the face image;
   determining a size range of a size of the facial feature based on the face image; and
   determining a transformation relationship between the facial feature of the face of the user and a virtual facial feature of an avatar based on the size range of the size of the facial feature and a virtual size range of a virtual size of the virtual facial feature,
   wherein face tracking method further comprising:
   according to a user instruction, performing a calibration of the transformation relationship; wherein during the calibration, the processor is configured to, while the user makes a neutral facial expression, mapping the neutral facial expression of the user to a virtual neutral facial expression of the avatar by aligning a difference between a neutral size of the size of the facial feature and a neutral virtual size of the virtual facial feature, wherein the virtual neutral facial expression is a neutral expression.

12. The face tracking method according to claim 11, further comprising:
   determining the neutral size of the size of the facial feature based on the face image;
   mapping the neutral size to the neutral virtual size of the virtual facial feature.

13. The face tracking method according to claim 11, further comprising:
   determining a maximum size of the size of the facial feature based on the face image; and
   mapping the maximum size to a virtual maximum size of the virtual facial feature.

14. The face tracking method according to claim 11, further comprising:
   determining a minimum size of the size of the facial feature based on the face image; and
   mapping the minimum size to a virtual minimum size of the virtual facial feature.

15. The face tracking method according to claim 11, further comprising:

determining a shift factor based on the difference between the neutral size of the size of the facial feature and the neutral virtual size of the virtual facial feature; and mapping the size of the facial feature to the virtual size of the virtual facial feature based on the shift factor.

16. The face tracking method according to claim 11, further comprising:

determining a scale factor based on a difference between a maximum size of the size of the facial feature and a neutral maximum size of the virtual facial feature; and mapping the size of the facial feature to the virtual size of the virtual facial feature based on the scale factor.

17. The face tracking method according to claim 11, further comprising:

determining a shift factor based on the difference between the neutral size of the size of the facial feature and the neutral virtual size of the virtual facial feature;

determining a scale factor based on a difference between a maximum size of the size of the facial feature and a neutral maximum size of the virtual facial feature; and mapping the size of the facial feature to the virtual size of the virtual facial feature by adding the shift factor to the size and then multiplying by the scale factor.

18. The face tracking method according to claim 11, further comprising:

performing a calibration of the transformation relationship based on user information in a memory during a startup of the face tracking method.

19. The face tracking method according to claim 11, further comprising:

mapping an extreme facial expression of the user to a virtual extreme facial expression of the avatar.

20. The face tracking method according to claim 11, further comprising:

updating the transformation relationship based on the face image over time.

* * * * *